Jan. 30, 1968    W. E. BRON ETAL    3,366,818
CATHODE RAY DEVICE WITH SCREEN HAVING INTEGRITY AGAINST STRESS
Filed July 6, 1965    2 Sheets-Sheet 1

INVENTORS
WALTER E. BRON
WILLIAM R. HELLER
PAUL A. ROLAND

BY Bernard N. Wiener

ATTORNEY

3,366,818
CATHODE RAY DEVICE WITH SCREEN HAVING INTEGRITY AGAINST STRESS

Walter E. Bron, Briarcliff Manor, N.Y., William R. Heller, Saratoga, Calif., and Paul A. Roland, Bronxville, N.Y., assignors to International Business Machines Corporation, Armonk, N.Y., a corporation of New York
Filed July 6, 1965, Ser. No. 469,477
14 Claims. (Cl. 313—91)

ABSTRACT OF THE DISCLOSURE

This disclosure provides a dark trace tube whose screen has an active surface layer with integrity against mechanical damage due to stresses resultant from thermal cycling. By making the alkali-halide layer as a predetermined pattern of islands on the substrate rather than as a completely continuous film, an improved continuing adhesion is obtained for it on the substrate during thermal cycling. The resultant structure maintains its mechanical integrity against thermally induced stresses for an operational lifetime of a large number of erasure thermal cycles. This disclosure presents a solution to the problem of cracking and flaking due to thermal cycling of the active surface of the prior art screen of a dark trace tube. It has been discovered that the cracking and flaking of the active surface from the substrate of the screen are due to mechanical stresses in the active surface which are too great to be absorbed elastically in the screen. The destructive stresses result from induced mechanical strains due to the temperature changes of erasure thermal cycling. Formation of cracks results from unexpended elastic energy that propagates uncontrollably throughout the active surface layer with consequent damage to it and impairment of its suitability for storing dark trace images.

---

This invention relates generally to cathode ray tubes and screens therefor, and it relates more particularly to a dark trace tube and screen therefor having an active surface layer and its substrate support which are compatible against mechanical damage due to stresses resultant from thermal cycling.

A cathode ray tube is an information storage and display device in which an electron beam is caused to impinge on a screen and to trace therein an image. Usually, the image remains in the screen only for approximately the retention time necessary for visual observation, i.e., there is short term persistence of the image. A dark trace tube is a type of cathode ray tube in which an image written on its screen remains for a significant interval greater than merely for visual observation, i.e., there is long term persistence of the image. The screen must be capable of retaining the written image in the presence of light of significant intensity. A particular type of prior art screen has a mica insulator substrate with an electron beam responsive active layer of alkali-halide, e.g., potassium-chloride, thereon.

In order to be sensitively responsive in an appreciable portion of its thickness to the electron beam for image formation, the active surface layer of alkali-halide is usually very thin compared to the thickness of the substrate support layer of mica. Development of trapped electrons at F-center or color center sites in the alkali-halide layer effects an image along the path of the traversing electron beam. Illustratively, the color centers are developed in a thin layer, e.g., 10 microns, of polycrystalline potassium-chloride deposited in adhesive relationship on a relatively thick, one mil insulator substrate support, e.g., mica. They cause the potassium-chloride to have a magenta tint dark trace where the traversing electron beam has penetrated it. The electronic configuration of a color center absorbs light preferentially with regard to frequency. A thin conductive layer, e.g., aluminum, is deposited on the active surface layer to provide a leakage path to ground for free electrons. A background article is "Recent Dark-Trace Tube Developments" published in the IRE Transactions on Electrons Optics, January 1956, pp. 66 to 70.

A dark trace image is removed from the screen by heat. As a consequence of imparting thermal energy to the alkali-halide, trapped electrons migrate to the surface of the layer or recombine with trapped holes. Illustratively, a temperature of between 200° C. and 400° C. is usually required to effect the removal of a dark trace image. Furthermore, in order to manufacture a dark trace tube and effect the proper vacuum seals therein, a single heating cycle for the entire tube exceeding 400° C. has also been required. There has been both cracking of the active layer and its flaking from the substrate as a basic difficulty of the thermal cycling with resultant impairment of the operational lifetime of the dark trace tube. The alkali-halide is severely strained mechanically during the tube sealing operation and subsequent erasure thermal cycles. The resultant cracking and flaking of the alkali-halide has severely constrained use of this type dark trace tube for practical purposes.

It is an object of this invention to provide a cathode ray tube which has a screen with mechanical integrity against damage due to thermal cycling.

It is another object of this invention to provide a dark trace tube with screen therefor having an active surface layer which is compatible with a support substrate therefor to prevent damage of the layer due to stress produced during thermal cycling.

In an aspect of the invention, the active surface layer is established as discrete islands on a support substrate and stored mechanical stress energy consequent from thermal cycling is limited by the small areal dimension of the islands. The islands are demarcated by contiguous discontinuity perimeter boundaries which prevent the elastic energy developed by thermal stress from concentrating its effect at a single crack or at a few cracks which can then grow catastrophically.

It has been discovered for the practice of this invention, that the cracking and flaking of the active surface layer from the substrate of the screen of a dark trace tube is due to mechanical stresses in the active surface layer which are too great to be absorbed elastically in the screen. The destructive stresses result from induced mechanical strain due to temperature change of erasure thermal cycling. The crack formation results from unexpended elastic energy that propagates uncontrollably throughout the active surface layer to its consequent damage and impairment of its suitability for storing dark trace images. The alakali-halide layer is severely strained during the tube sealing operation and subsequent thermal erasure cycles. The thermal coefficient of expansion of an alkali-halide is approximately 4.5 times greater than that of mica, and its elastic modulus is also considerably different than that of mica.

Practice of the present invention provides a solution to the problem of cracking and flaking of the active surface layer of the screen through a predetermined pattern of discontinuities in the active layer. The resultant structure maintains its mechanical integrity against thermally induced stresses for an operational lifetime of a large number of erasure thermal cycles. An active surface layer established as islands on a mica substrate each with a perimeter boundary having a different elastic modulus than the active surface alkali-halide provides a screen especially suitable for the practice of this invention.

The foregoing and other objects, features and advantages of the invention will be apparent from the following more particular description of a preferred embodiment of the invention, as illustrated in the accompanying drawings.

Theory of invention

Figure 1A:
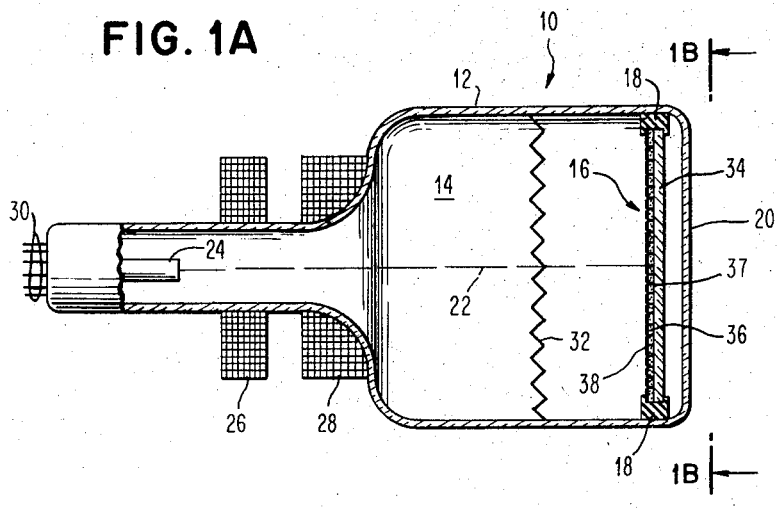
FIGURE 1A is a schematic diagram of a dark trace tube with screen therein for the practice of this invention which illustrates in a sectional view the relative locations of the several layers of the screen.

It has been discovered for the practice of this invention that the thermal expansion coefficient and elastic modulus of both the active surface layer and the support substrate therefor of the screen of the dark trace tube are important physical parameters involved in specifying a solution of the problem of damage due to the operational requirement of thermal cycling in the fabrication and operation of the tube.

By making the alkali-halide layer as islands on the substrate rather than as a completely continuous film, an improved continuing adhesion is obtained for it on the substrate during thermal cycling. The manner in which a predetermined pattern of discontinuities in the active surface layer improves the adhesion property thereof to the substrate will now be described. Decrease in the total internal energy of the system consisting of the active surface layer and substrate, of which the most pertinent part is the surface energy at the interface, maintains adhesion. Prior to their adhesion each layer has a total energy including the interface surface energy. By placing the two layers in contact forming an interface there is a diminution of the total surface energy which is sufficient to maintain adhesion unless overcome by other forces. Damage to the screen from thermal cycling occurs primarily because mechanical stress at the interface surface, i.e., force per unit area, exceeds the critical stress for fracture of the adhesive bond.

An island of the active surface layer has stored strain energy proportional to its cross-sectional area, i.e., the total energy in any one island is dependent on the size of the island. If an island of the active surface layer has an incipient crack, the stored strain energy is relieved thereat tending to enlarge the crack. Thus, the greater the stored strain energy at the interface surface, the greater the damage due to cracking. As soon as there is a location within which the stored strain energy can be absorbed, e.g., a crack, it all flows thereto. On the atomic scale, there is a very small movement of atoms as one atom pushes its neighbor until the stored strain energy has propagated to the crack. In a continuous layer, energy is taken by a crack from the entire layer. By introduction of islands the stored elastic energy per crack is reduced and concentration effects cannot occur. A small amount of effective discontinuity in the weaker layer, e.g., contiguous perimeter boundaries of islands of the active surface layer, contributes significantly to lessening the amount of damage due to the thermal cycles.

The linear thermal expansion coefficient of a material, i.e., the change in linear dimension per unit linear dimension for unit change in temperature, can be correlated in a general way with its elastic modulus, i.e., the relationship between stress and resultant strain. Because the thermal expansion coefficient approaches zero at very low temperature, if the temperature of a material approaches its melting point, the effect of the coefficient becomes more significant for a given temperature change.

The thermal expansion coefficient and the elastic modulus of a material are distantly related on the atomic scale. The elastic modulus depends upon the forces between the atoms of a material, and upon the rate of change of these forces as the atoms are compressed together. However, the thermal expansion coefficient depends on a higher order effect, i.e., it depends on the atoms being further apart at a higher temperature than at a lower temperature, with a tendency to go further apart with a given change in temperature at the higher temperature. Thus, the thermal coefficient expansion depends only qualitatively on the same physical phenomena as the elastic modulus, and for practical design purpose they are usually considered to be independent physical parameters of a material.

Consideration of the stresses in the layers of a dark trace tube screen reveals that one layer may be in compression and an adjacent layer be in tension at a given temperature dependent upon the respective thermal expansion coefficient and elastic modulus. If one layer is weaker than the adjacent one, the weaker member should always be in compression to inhibit fracture. However, if the weaker member has the larger thermal expansion coefficient, as is the case for the active surface layer of potassium-chloride compared with the insulator support substrate of mica, the induced compression stresses therein are sufficient to cause fracture unless there is available some means to relieve the interface surface stress. When the active surface layer is in tension, the tendency for it to fracture is greater than when it is in compression, and the need to relieve the interface thermally induced stress is also present.

By considering the dark trace tube screen as a composite beam structure of two adjacent layers, one being weaker than the other, the approximate amount of curvature of the beam and the approximate stress at the interface surface can be determined from formulae involving the elastic moduli, thermal expansion coefficients, and thicknesses of the layers. Such consideration reveals that the interface surface stress is larger in proportion to the difference of the respective thermal expansion coefficients and is smaller in inverse proportion to the ratio of the elastic modulus of the weaker layer to the elastic modulus of the stronger layer.

Embodiment of invention

An embodiment of this invention will be described with reference to FIGS. 1 and 2 which illustrate a dark trace tube 10. Generally, it is constructed according to the prior art practice, but it incorporates a screen 16 in accordance with the principles of this invention. Within a chamber 14 of an envelope 12 of the dark trace tube 10, there is disposed the screen member 16 affixed by brackets 18 to the envelope 12 in parallel relationship to a viewed face 20 of the tube.

Figure 1B:
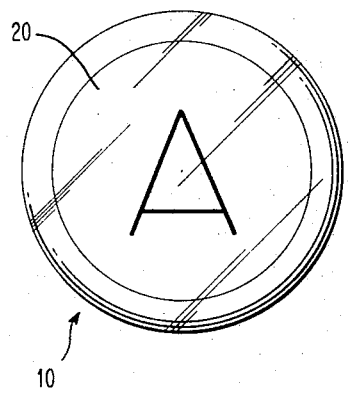
FIGURE 1B is a view of the face of the tube of FIGURE 1A showing an image written in its screen.

A dark trace image, e.g., the letter A of FIG. 1B, is established on screen 16 by the traversal thereon of an electron beam 22 from electron source 24 under control of focus coil 26 and deflection coil 28. Control signals and power for dark trace tube 10 are communicated thereto via the illustrative connection terminals 30 from conventional sources thereof, not shown. The image A remains observable in screen 16 via tube face 20 for an interval of time determined by the physical characteristics of screen 16. The image is permanent as compared with the transient image of the conventional cathode ray tube, but it is erased from screen 16 by thermal energy imparted thereto from a tungsten grid heater 32 energized by a power source not shown.

Figure 2:
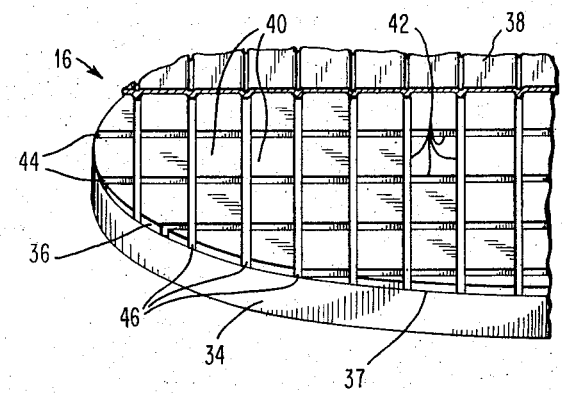
FIGURE 2 is a perspective view of an enlarge portion of the screen of a dark trace tube in accordance with this invention which illustrates the disposition of an active surface layer as islands on a substrate.

Screen 16, FIG. 2, is a composite structure having an insulator support 34, e.g., mica, upon which there is adhered an active surface layer 36, e.g., potassium-chloride. On active surface layer 36 there is a conductive layer 38, e.g., aluminum, which is connected to ground by a connection not shown. The conductive layer 38 is shown in FIG. 2 partially broken away to expose the active surface layer 36.

The active surface layer 36 is established on substrate 34 in a configuration of rectangular islands 40 separated by contiguous discontinuity perimeter boundaries 42 defined in FIG. 2 by horizontal grooves 44 and vertical grooves 46. The perimeter 42 of an island 40 is a discontinuity at which stress introduced to the interface 37 during a thermal cycle is relieved. The presence of aluminum 38 in horizontal grooves 44 and vertical grooves 46 merely changes the nature of the discontinuity perimeter boundaries 42 but not their effectiveness for relieving the destructive interface surface 37 energy due to a thermal cycle.

The substrate 34 is a relatively thick layer of transparent mica with sufficient structural rigidity to support the screen 16 within tube 10 when affixed thereto by brackets 18. The active surface layer 36 of potassium-chloride is a thin film which is deposited on substrate 34 by vacuum deposition as described below with reference to FIG. 4. The aluminum layer 38 on active surface layer 36 is very thin since it must not absorb electrons 22 appreciably. It provides a path to ground for electrons which are absorbed by the active surface layer 36 from the electron beam 22 in order to maintain electrical neutrality in the layer.

Figure 3A:
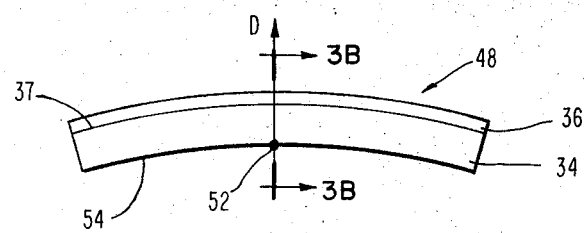
FIGURE 3A is a schematic drawing illustrating an island of the active surface layer and underlying substrate as a beam under flexure.
Figure 3B:
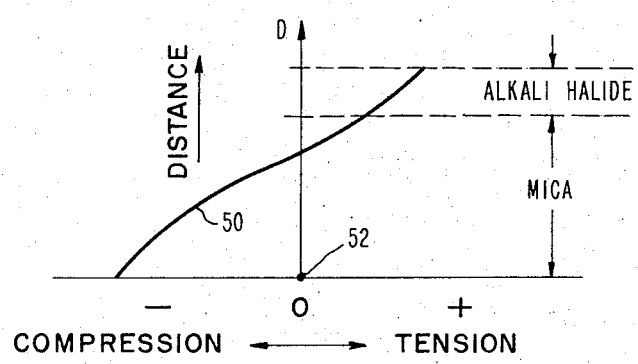
FIGURE 3B is a line diagram illustrating the relationship of the physical parameters strain and distance in the cross section linear dimension of the beam of FIGURE 3A under flexure.

FIG. 3 ilustrates an exemplary beam 48 identifiable as a portion of screen 16 which includes both an island 40 of the active surface layer 36 and the portion of substrate 34 therefor. Beam 48 is shown with curvature which is exemplary of the physical distortion of screen 16 during a thermal erasure cycle. As shown in FIG. 3A, the active surface layer 36 is under tension stress, tending to elongate it, as will be described below in greater detail with reference to FIG. 3B. If the tension stress is sufficient, and there is no means available to relieve the surface energy present in the interface surface 37, a crack will develop in active surface layer 36. If the tension stress is excessive, the active surface layer 36 will separate from the substrate 34 in a manner termed flaking. The cracking and flaking of active surface layer 36, during thermal cycles for dark trace tube 10 of FIG. 1A, deteriorates the screen 16 for practical purposes.

By the provision of the contiguous discontinuity perimeter boundaries 42 of islands 40, the thermally induced interface surface stress is relieved thereat. Thus, by provision of a sufficient amount of effective discontinuity in active surface layer 36, the cracking and flaking as consequence of thermal cycles is curtailed. Consequently, by the practice of this invention the operational lifetime of dark trace tube 10 is significantly enhanced over that of a prior art dark trace tube. Statistically, there is a probability that a few of the islands 40 may become detached from substrate 34 over the operational lifetime of dark trace tube 10, e.g., 20,000 erasure thermal cycles. However, the islands 40 are so small and so numerous that the degradation of the image quality due to cracking of the active surface layer over the operational lifetime of tube 10 is illustratively less than one percent.

The graph line 50 of FIG. 3B indicates the relationship between strain and distance in the linear dimension of the cross section of the beam 48 of FIG. 3A, where the vertical distance on axis D is measured from point 52 on the lower surface 54 of substrate layer 34. As the substrate 34 is thicker than the active surface layer 36, the lower surface 54 of substrate 34 is in compression strain, and the neutral point is between the lower surface 54 of the active surface layer 36 and the interface surface 37. Thus, the entire active surface layer 36 is in tension strain.

In FIG. 3A the substrate 34 is curved downward from the active surface layer 36, and the material of the screen 16 at the interface surface 37 between the layers is in tension. The material at the interface surface 37 between the layers is in tension. The material at the interface would be in compression were the flexure of beam 48 such as to make substrate 34 to be curved upward toward active surface layer 36. Whether the flexure of substrate 34 is upward or downward is largely determined by any structural deflection it has normally. In a perfect beam 48, the deflection would be downward as the alkali-halide is the weaker layer.

Figure 4:
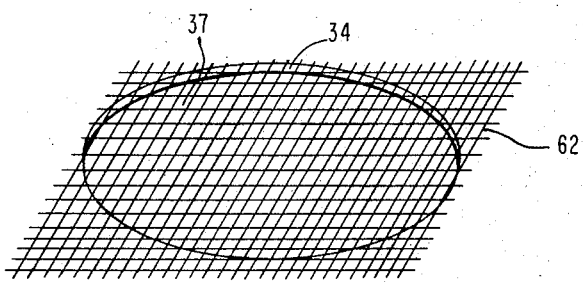
FIGURE 4 is a perspective view illustrating the vacuum deposition technique utilized for establishing an alkali-halide layer in the form of islands on a mica substrate.

A vacuum deposition technique for establishing an active surface layer 36 on substrate layer 34 will be described with reference to FIG. 4. The vacuum equipment is not shown. Alkali-halide potassium-chloride powder, not shown, is established in tantalum container 56 which has heater wire 58 wrapped thereon. When heater wire 58 is energized by a power source not shown, the potassium-chloride molecules 60 from container 56 are vacuum deposited on mica substrate 34 through the openings of fine wire mesh 62 interposed between the mica substrate 36 and tantalum container 56. The wires of wire mesh 62 shadow the interface surface 37 of substrate 34 so that a thin film layer of the alkali-halide is deposited on substrate 34 as islands 40 with contiguous discontinuity perimeter boundaries 42. After the composite structure of alkali-halide islands and mica substrate has been fabricated, and the wire mesh 62 is removed from its proximity, a thin film of aluminum is vacuum deposited over the entire surface of alkali-halide islands 40 and boundaries 42. The aluminum in the discontinuity perimeter boundaries 42 does not impair effectiveness of boundaries 42 for relieving interface stress in the alkali-halide due to thermal cycles. After the fabrication of screen 16, it is mounted in dark trace tube 10 of FIG. 1A by brackets 18.

The wire mesh mask 62 utilized for shadowing the mica substrate during vacuum deposition of the alkali-halide film 36 has been found to require a mesh of between 200 to 400 lines per inch. When the mesh 62 is less than 200 lines per inch, the islands can be observed visually and the quality of image formation is somewhat degraded. When the mesh 62 is more than 400 lines per inch, it is difficult to obtain a clearly defined segmenting of the active surface layer 34. A mesh of 325 lines per inch has permitted preparation of a screen 16 satisfactory both as to protection against damage and as to proper contrast of an image against the background. In addition, the mesh 62 should have a high transmission value, i.e., the openings between the wires should be relatively large compared to the wire diameter.

Procedures which have been helpful in preparation of a satisfactory dark trace tube 16 will now be described. The mica support substrate 34 is washed with a two megohm grade water containing a small amount of detergent. Thereafter, trapped moisture in the mica is evaporated out by heating the mica at a temperature slightly above 115° C. for an extensive period. A small amount of potassium-chloride powder, e.g., 5 grams, is evaporated in a vacuum of about 10⁻⁵ mm. of mercury from tantalum container 56 for a period of about 5 minutes to obtain a segmented layer of potassium-chloride 34 with a thickness of from 10 to 12 microns. Thereafter, a thin layer of electrically conductive aluminum 38, e.g., 0.1 micron, is deposited over the entire potassium-chloride layer. It also forms a conductive path in the perimeter boundaries 42. A stream of nitrogen is maintained in the location of the screen 16 while the dark trace tube 10 is being assembled. After the assembly of tube 10, it is heated in a preparation heat furnace, not shown, to approximately 450° C. to complete the glass vacuum seals. Thereafter, the chamber 14 of tube 10 is pumped to obtain a vacuum therein. Finally, tube 10 is removed from the preparation heat furnace.

In its broader aspect, the practice of the invention includes any predetermined pattern of discontinuities in the active surface of the screen of a cathode ray tube, the invention not being limited to use of contiguous perimeter boundaries. Although the particular predetermined pattern of discontinuities in the alkali-halide film has been disclosed herein to be a pattern of rectangular islands, any pattern of segments which defines small enough areas with contiguous discontinuity perimeter boundaries will suffice for the practice of this invention.

In addition, although mica has been mentioned herein as an exemplary substrate for the screen, other known materials will serve. Further, the active surface layer may be other than potassium-chloride. Illustratively, other alkali-halides having suitable color centers, as well as other known materials, may be used.

While the invention has been particularly shown and described with reference to a preferred embodiment thereof, it will be understood by those skilled in the art that various changes in form and details may be made therein without departing from the spirit and scope of the invention.

What is claimed is:
1. A dark trace tube comprising:
means for forming an electron beam;
a viewing screen disposed to intercept said beam, said screen having
   a support substrate layer and
   an active surface layer of alkali-halide adhering to said substrate layer and forming an interface surface therebetween,
      said active surface layer having a predetermined pattern of discontinuities therein to limit elastic energy in continuous portions thereof defined by said discontinuities, said energy resulting from thermally induced strain in said active layer surface; and
a conductive layer adhering to and electrically connecting said active surface layer.

2. A dark trace tube according to claim 1 wherein said predetermined pattern of discontinuities in said active surface layer is a plurality of contiguous perimeter boundaries of a plurality of segments thereof, respectively.

3. A dark trace tube according to claim 2 wherein said plurality of segments of said active surface layer is a plurality of islands having said contiguous discontinuities perimeter boundaries, respectively.

4. A dark trace tube according to claim 3 wherein said islands of said active surface layer are members of an array.

5. A dark trace tube according to claim 4 wherein said members of said array are rectangles.

6. A dark trace device comprising:
an electron beam tube;
a viewing screen mounted in said tube, said screen having
   an insulator support substrate layer of mica and
   an active surface layer of potassium-chloride adhering to said substrate layer and forming an interface surface therebetween,
      said active surface layer being segmented into a predetermined pattern of islands with contiguous discontinuity perimeter boundaries, respectively, to limit elastic energy in continuous portions thereof defined by said boundaries, said elastic energy resulting from thermally induced strain in said active surface layer; and
a conductive layer adhering to and electrically connecting said active surface layer.

7. A viewing screen for a dark trace tube comprising:
a substrate support layer;
an active surface layer of alkali-halide adhering to said support layer and forming an interface surface therebetween,
   said active surface layer having a predetermined pattern of discontinuities therein to limit elastic energy in continuous portions thereof defined by said discontinuities, said energy resulting from induced strain in said active surface layer; and
a conductive layer adhering to and electrically connecting active surface layer.

8. A screen according to claim 7 wherein
said substrate support layer is mica;
said active surface layer is potassium-chloride disposed as islands on said substrate layer having said predetermined pattern of dicontinuities therein as contiguous perimeter boundaries thereof, respectively; and
said conductive layer is aluminum.

9. A cathode ray device comprising:
an electron beam tube;
a viewing screen, said screen having
   a substrate layer and
   an active surface layer adhering to said substrate layer and forming an interface surface therebetween,
      said active surface layer having a predetermined pattern of discontinuities therein to limit elastic energy in continuous portions thereof defined by said discontinuities, said energy resulting from induced strain in said active surface layer; and
means for removing free electrons from said active surface layer; said means for removing said free electrons being a conductive layer adhering to and electrically connecting said active surface layer.

10. A cathode ray device according to claim 9 wherein said support substrate layer is a light transparent layer.

11. A cathode ray device according to claim 10 wherein said light transparent layer is mica.

12. A cathode ray device comprising:
an electron beam tube;
a viewing screen, said screen having
   a substrate layer and
   an active layer adhering to said substrate layer and forming an interface surface therebetween,
      said active surface layer being an alkali-halide and having a predetermined pattern of discontinuities therein to limit elastic energy in continuous portions thereof defined by said discontinuities, said energy resulting from induced strain in said active surface layer; and
means for removing free electrons from said active surface layer.

13. A cathode ray device according to claim 13 wherein said alkali-halide is potassium-chloride.

14. A viewing screen for a cathode ray tube comprising:
a substrate layer;
an active surface layer adhering to said substrate layer and forming an interface surface therebetween, said active surface layer having a predetermined pattern of discontinuities therein to limit elastic energy in continuous portions thereof defined by said discontinuities, said energy resulting from induced strain in said active surface layer; and means for removing free electrons from said active surface layer, said means for removing free electrons being a conductive layer adhering to and electrically connecting said active surface layer.

References Cited

UNITED STATES PATENTS

| 2,021,907 | 11/1935 | Zworykin | 313—329 |
| 2,120,099 | 6/1938 | Iams | 313—329 |

JAMES W. LAWRENCE, *Primary Examiner.*

V. LA FRANCHI, *Assistant Examiner.*